Aug. 19, 1969    A. R. ZUBIK ET AL    3,461,641

PACKAGING OF SYNTHETIC RUBBER BLOCKS

Original Filed June 11, 1964    2 Sheets-Sheet 1

INVENTORS.
ARNOLD R. ZUBIK, JOHN C. MOSLEY,
BY John B. Davidson
ATTORNEY.

Aug. 19, 1969  A. R. ZUBIK ET AL  3,461,641
PACKAGING OF SYNTHETIC RUBBER BLOCKS

Original Filed June 11, 1964  2 Sheets-Sheet 2

INVENTORS.
ARNOLD R. ZUBIK, JOHN C. MOSLEY,
BY John B. Davidson
ATTORNEY.

United States Patent Office 3,461,641
Patented Aug. 19, 1969

3,461,641
PACKAGING OF SYNTHETIC RUBBER BLOCKS
Arnold R. Zubik and John C. Mosley, Baytown, Tex., assignors, by mesne assignments, to Esso Research and Engineering Company, Elizabeth, N.J., a corporation of Delaware
Original application June 11, 1964, Ser. No. 374,390, now Patent No. 3,321,889, dated May 30, 1967. Divided and this application Dec. 5, 1966, Ser. No. 599,291
Int. Cl. B65b 63/02, 1/20, 13/20
U.S. Cl. 53—24                              2 Claims

ABSTRACT OF THE DISCLOSURE

A block of rubber material is packed in a carton using a shallow, box-like member having an open bottom smaller than and of substantially the same shape as the upper surface of the block by encapsulating the block in a film of substantially gas-impervious material, lowering the box-like member onto the upper surface of the material, drawing the central portion of the upper surface of the block up into the box-like member by reducing the pressure in the box-like member and within the block to constrict the block, lowering the block into the carton, and releasing the low pressure within the block.

---

This is a division of application Ser. No. 374,390, filed June 11, 1964, and entitled, "Packaging of Synthetic Rubber Blocks," by Arnold R. Zubik et al.

The present invention is directed to the packaging of rubber blocks, and more particularly to a technique of handling synthetic rubber blocks enveloped in a thin plastic film so that the film is not damaged when the blocks are deposited in cartons.

The preparation of synthetic rubber for shipment poses a number of problems. Generally speaking, it is desirable to form a synthetic rubber into blocks preparatory to shipping the rubber to a final processor in order to minimize shipping costs. Furthermore, it is desirable to encapsulate the blocks in film to minimize damage thereto and to facilitate handling thereof. However, the blocks are very difficult to handle, particularly when packing them in cartons. When the blocks are encapsulated in thin film, the film tends to tear while the blocks are being packed in cartons.

In accordance with one aspect of the present invention, synthetic rubber particles are formed into a substantially rectangular block and are encapsulated in a film of substantially gas-impervious material. A hole is punched in the upper surface of the film and a box-like member is lowered over the upper surface of the block and over the hole. The pressure within the box-like member is reduced so as to draw air out of the interior of the film to constrict the synthetic rubber block, and to pull the upper surface of the block up into the shallow, box-like member. The box-like member and the block of synthetic rubber are thereupon lowered into the carton, and the vacuum within the film is released to permit separation of the box-like member and the film and the rubber block.

Objects and features of the invention not apparent from the above discussion will become evident upon consideration of the following detailed description thereof when taken in connection with the accompanying drawings, wherein.

The synthetic rubber which is most suitable for use in accordance with the invention is butyl rubber, which is a copolymer of a diolefin and a tertiary monoolefin. According to the usual technique of manufacturing butyl rubber, such as that described in U.S. Patent No. 2,474,-592, the butyl rubber is produced in the form of crumbs or particles. To form blocks or bales of butyl rubber it is most desirable that particle sizes ranging from about $\frac{1}{16}$ inch to about 2 x 6 x 10 inches be used. It is contemplated that crumbs or particles of butyl rubber of non-uniform size may be processed in accordance with the invention, which particles may be of any shape.

The blocks or bales are formed by application of mechanical pressure to a confined body of rubber particles. Pressures may be in the range of about 800 to about 3500 p.s.i., with a preferred range of pressure between 1000 to about 1600 p.s.i. Temperatures may range from about 140° F. to about 250° F., with a preferred temperature range from about 160° F. to about 180° F. To form the blocks, the high pressure and temperature is applied from about 5 to 60 seconds, preferably from about 5 to around 20 seconds. Application of these conditions to a confined body of butyl rubber results in a bale or block having a density at least twice as great as that of the originally confined body of butyl particles. Thus, the confined body may have a density of about 18 to about 25 pounds of butyl crumbs, usually about 20 pounds, and 25 to 35 pounds for worked butyl particles, usually about 30 pounds. The bale or block, however, will have a density range from about 40 to about 54 pounds per cubic foot.

Figure 1:
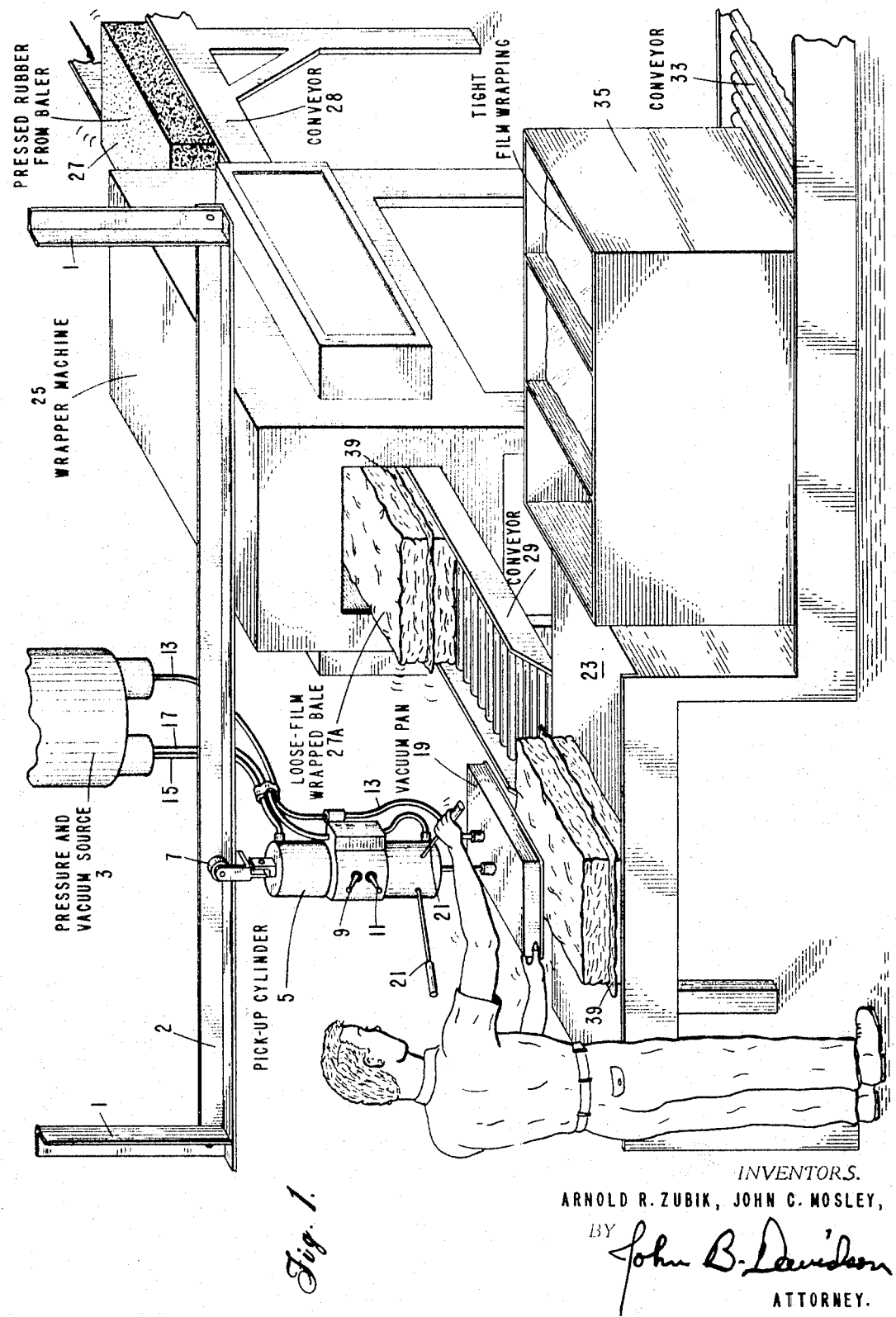
FIG. 1 is a perspective view of apparatus for use in accordance with the invention.
Figure 2:
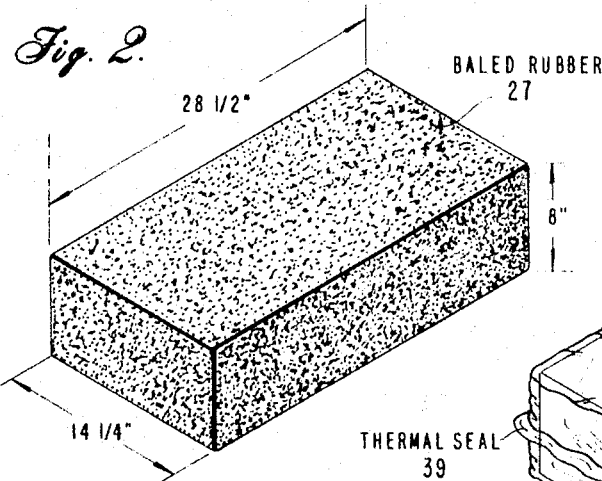
FIG. 2 is a perspective view of a block of synthetic rubber to be picked up and handled in accordance with the invention.
Figure 3:
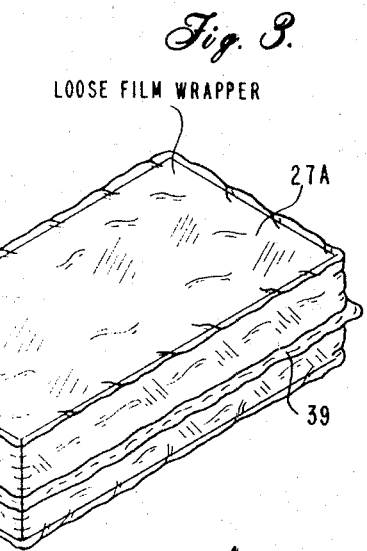
FIG. 3 is a perspective view of the block of rubber of FIG. 2 encapsulated in a thin, non-porous film.

After the block 27 of butyl rubber has been formed, it is transported on a roller conveyor, such as that designated by the reference numeral 28 in FIG. 1. In FIG. 1 there is shown a block of butyl rubber being transported on conveyor 28 to a wrapping machine 25. The block is conveyed into the wrapping machine 25 whereat it is placed between thin rectangular films which are pressed together thereabout and subjected to heat so as to thermally seal together. The result of the thermal seal will be a flap, such as designated by the reference numeral 39 (see in particular FIG. 3). The material from which the film is formed should be substantially gas-impervious and may be formed from polyethylene, polypropylene, or other plastics known to the art. The encapsulated block 27A is transported from the wrapping machine 25 by roller conveyor 29 to a work table 23.

On a roller conveyor 33 adjacent work table 23, there is positioned a multisection carton 35 for accommodating a plurality of wrapped rubber bales. For reasons of economy, the bales should be packed as tightly as possible in the carton 35. It is usual to use a tri-sectional carton, each section being able to accommodate five or six bales of rubber.

Apparatus for picking up the encapsulated rubber bales and injecting them into the carton 35 is positioned above the work table 23 and carton 35. This apparatus comprises a vacuum pan 19 connected to a piston (not shown) in a pickup cylinder 5. The piston is pneumatically actuated so as to move up and down in accordance with the differential pressure thereacross exerted thereon by pressure from a pressure and vacuum source 3 through lines 15 and 17. A control valve actuated by lever or push-buttons 9 selectively moves the piston up and down to correspondingly move the vacuum pan 19. The pickup cylinder is suspended from a roller 7 on a track 2, which track is in turn suspended by vertical members 1 from a suitable support (not shown). The roller member 7 permits the pickup cylinder to be moved back and forth from over the work table 23 to above the carton 35. Hand-holds 21 attached to pickup cylinder 5 permit the operator to move the pickup cylinder back and forth between the work table 23 and the carton 35. A vacuum line 13 controlled by a valve actuated by lever or pushbutton 11 connects the pressure vacuum source 3 to the interior of the vacuum pan 19.

Figure 4:
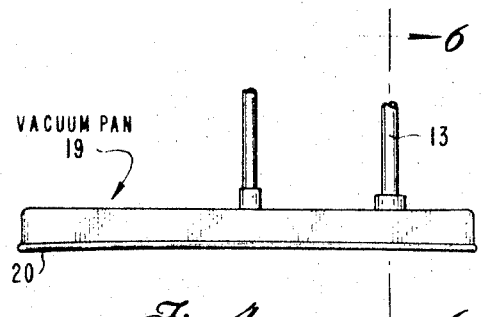
FIG. 4 is a view of a vacuum pan suitable for use in accordance with the invention.
Figure 5:
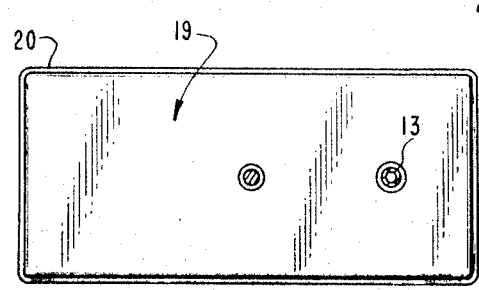
FIG. 5 is a top view of the pan of FIG. 4.
Figure 6:
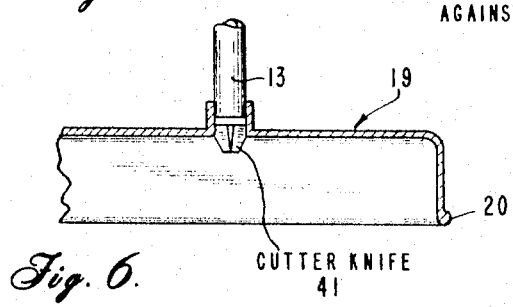
FIG. 6 is a cross-sectional view taken along section 6—6 of FIG. 4.
Figure 8:
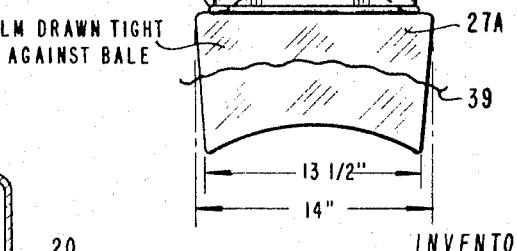
FIG. 8 is an end view of the apparatus shown in FIG. 7.

The construction of the vacuum pan 19 is best illustrated in FIGS. 4 and 5. As shown, the vacuum pan is quite shallow, preferably from 2 to 2½ inches deep, and may be described as being upwardly dished. The open portion of the vacuum pan faces downwardly and the bottom sides thereof are slightly concave so as to form a lip 20 thereabout. The vacuum connection 13 extends through the top of the pan toward one side thereof. As shown in FIG. 6, a knifecutter 41 is positioned just below the vacuum hose 13 so as to extend ½ inch to 1 inch into the vacuum pan from the upper surface thereof. The function of the knifecutter is to slit or puncture the wrapper or encapsulation of the rubber bale 27A when a vacuum less than 6 inches of mercury is used.

Figure 7:
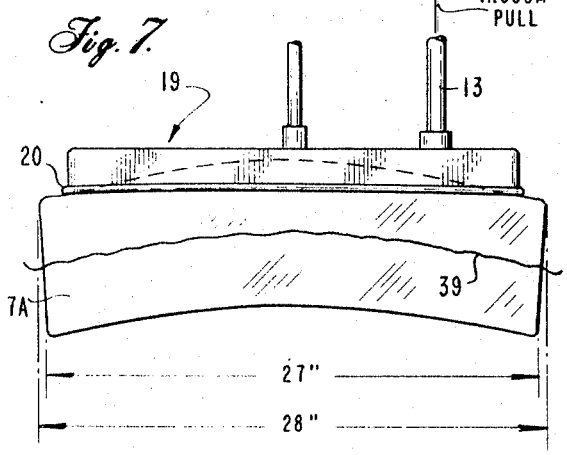
FIG. 7 is a view of the vacuum pan similar to FIG. 4, holding the synthetic rubber block of FIG. 3.

The operation of the apparatus described above is as follows. Let it be assumed that a synthetic rubber bale has been formed by compression and subjection to moderate temperature as described. The bale will go into the wrapping machine 25 wherein it will be positioned between sheets of non-porous film. The non-porous film will be fused together thermally to form a thermal seal flap 39. The bale 27A, including the thermal seal flap 39, is discharged from the wrapping machine 25 and transported by conveyor 29 to the work table 23. The operator positions the vacuum pan 19 over the block of synthetic rubber and lowers the pan onto the block by actuation of switch 9. When the pan securely engages the block, the film is drawn upward by the vacuum, and the sharp knifecutter 41 will slit the film (or in cases of vacuum above 6 inches, the film will rupture without use of a knife) so as to permit air to be drawn out of the film and synthetic rubber. However, this slitting action also may occur if it is not desired to press the pan down on the bale excessively by applying vacuum from source 3 by actuating toggle switch 11. When the vacuum is applied, the upper face of the synthetic rubber block and the film thereover will be drawn up into the pan so that the block is wedge shaped as illustrated in FIG. 7. Furthermore, the dimensions of the block will shrink to some extent. As illustrated, the block, before being subjected to the vacuum, may have dimensions of 28½ x 14½ x 8 inches. After subjection to the vacuum, the length and breadth of the block will shrink substantially. The length, for example, will shrink to between 27 and 28 inches, and the breadth to 13½ to 14 inches. The operator may then retract the vacuum pan and the block by actuation of switch 9 and roll the pickup cylinder to above one of the sections of carton 35. When the synthetic rubber block is lowered into the carton, the vacuum is released. The block will very readily enter the carton in spite of the fact that the dimensions of the sections thereof are substantially the same as the dimensions of the synthetic rubber block. After the vacuum has been released, the vacuum pan 19 may be raised and positioned above the next synthetic rubber block.

Although the embodiment disclosed in the preceding specification is preferred, other modifications will become apparent to those skilled in the art which do not depart from the scope of the broadest aspects of the invention.

What is claimed is:

1. The method of packing a shrinkable or constrictable block of rubber material in a carton, said block and said carton each having dimensions substantially the same, using a shallow box-like member having an open bottom smaller than and of substantially the same shape as the upper surface of the block, comprising:

encapsulating said rubber block in a film of substantially gas-impervious material;

perforating the upper surface of the material;

lowering the box-like member over the perforated upper surface;

reducing the pressure within said box-like member and said film to constrict the rubber block and pull the central portion of the upper surface of said rubber block into the box-like member; and lowering said constricted rubber block into said carton.

2. The method of packing a shrinkable or constrictable block of rubber material in a carton, said block and said carton each having dimensions substantially the same, using a shallow box-like member having an open bottom smaller than and of substantially the same shape as the upper surface of the block, comprising:

encapsulating said rubber block in a film of substantially gas-impervious material;

lowering the box-like member onto the upper surface of the material;

drawing the central portion of the upper surface of said rubber block up into said box-like member by reducing the pressure in said box-like member and within the rubber block to constrict the block;

lowering said constricted rubber block into said carton; and releasing the low pressure within said rubber block.

References Cited

UNITED STATES PATENTS

| | | | |
|---|---|---|---|
| 3,040,920 | 6/1962 | Harris | 294—64 X |
| 3,307,319 | 3/1967 | Christensen et al. | 53—24 X |
| 3,327,450 | 6/1967 | Carter | 53—166 X |
| 3,318,468 | 5/1967 | Olson | 294—64 X |

TRAVIS S. McGEHEE, Primary Examiner